(12) United States Patent
Thrimawithana et al.

(10) Patent No.: US 11,791,739 B2
(45) Date of Patent: Oct. 17, 2023

(54) AC-AC CONVERTER

(71) Applicant: AUCKLAND UNISERVICES LIMITED, Auckland (NZ)

(72) Inventors: Duleepa Jayanath Thrimawithana, Auckland (NZ); Gaurav Rajesh Kalra, Auckland (NZ); Martin Neuburger, Göppingen (DE)

(73) Assignee: AUCKLAND UNISERVICES LIMITED, Auckland (NZ)

( * ) Notice: Subject to any disclaimer, the term of this patent is extended or adjusted under 35 U.S.C. 154(b) by 0 days.

(21) Appl. No.: 16/964,953

(22) PCT Filed: Jan. 25, 2019

(86) PCT No.: PCT/NZ2019/050005
§ 371 (c)(1),
(2) Date: Jul. 24, 2020

(87) PCT Pub. No.: WO2019/147143
PCT Pub. Date: Aug. 1, 2019

(65) Prior Publication Data
US 2021/0050794 A1  Feb. 18, 2021

(30) Foreign Application Priority Data

Jan. 25, 2018 (NZ) ........................................ 739431

(51) Int. Cl.
*H02M 5/458* (2006.01)
*H02J 50/10* (2016.01)
(Continued)

(52) U.S. Cl.
CPC ........... *H02M 5/4585* (2013.01); *B60L 53/12* (2019.02); *B60L 53/14* (2019.02); *B60L 53/22* (2019.02);
(Continued)

(58) Field of Classification Search
None
See application file for complete search history.

(56) References Cited

U.S. PATENT DOCUMENTS 9,306,468 B2    4/2016  Bhatt et al.
10,879,839 B2 * 12/2020  Ayyanar .............. H02M 3/1582
(Continued)

FOREIGN PATENT DOCUMENTS

| CN | 100499343 C | 6/2009 |
| CN | 104852595 B | 1/2018 |
| WO | 2017014648 A1 | 1/2017 |

OTHER PUBLICATIONS

International Search Report & Written Opinion for PCT/NZ2019/050005, dated Apr. 1, 2019.

*Primary Examiner* — Daniel Kessie
(74) *Attorney, Agent, or Firm* — Pilloff Passino & Cosenza LLP; Martin J. Cosenza (57) ABSTRACT

The present disclosure relates to a boost active bridge converter, which has particular, but not sole, relevance to a converter for an inductive or capacitive (wireless) power transfer system. According to an embodiment An AC-AC converter is presented. The AC-AC converter comprises a bridge circuit including at least two half-bridge converters, each half bridge converter comprising a first switch at an upper end and a second switch at a lower end, a capacitor connected to each half-bridge converter, the half bridge converters being connected to each other between the respective first switches and second switches thereof, the upper ends of each half bridge converters being connectable to a primary energy source, wherein the converter is operable to provide a controllable AC output.

30 Claims, 10 Drawing Sheets (51) Int. Cl.
  B60L 53/12   (2019.01)
  B60L 53/22   (2019.01)
  B60L 53/14   (2019.01)
  H02J 7/06    (2006.01)
  H02M 1/14    (2006.01)

(52) U.S. Cl.
  CPC ............... H02J 7/06 (2013.01); H02J 50/10 (2016.02); *B60L 2210/20* (2013.01); *H02J 2207/20* (2020.01); *H02M 1/14* (2013.01)

(56) References Cited

U.S. PATENT DOCUMENTS

| | | | |
|---|---|---|---|
| 2005/0218876 A1* | 10/2005 | Nino | H02M 3/1582 |
| | | | 323/282 |
| 2014/0098583 A1* | 4/2014 | Nishibori | H02M 1/4208 |
| | | | 363/89 |
| 2015/0077003 A1* | 3/2015 | Vonach | H05B 45/39 |
| | | | 315/200 R |
| 2015/0207335 A1* | 7/2015 | Madawala | B60L 55/00 |
| | | | 307/104 |
| 2015/0229225 A1* | 8/2015 | Jang | H02M 3/33569 |
| | | | 363/17 |
| 2019/0267827 A1* | 8/2019 | He | H02J 7/342 |
| 2020/0091838 A1* | 3/2020 | Wada | H02M 1/14 |

* cited by examiner

AC-AC CONVERTER

FIELD OF THE DISCLOSURE

The present disclosure relates to a boost active bridge converter, which has particular, but not sole, relevance to a converter for an inductive or capacitive (wireless) power transfer system.

BACKGROUND

Over the last decade, Inductive Power Transfer (IPT) technology has been increasingly utilised in numerous industrial and consumer applications that require wireless power transfer, mainly due to its ability to provide high levels of power transfer, in a safe, reliable and convenient manner. Such applications include powering automated guided vehicles (AGV); materials handling; charging of portable electronic devices and powering biomedical devices. However, the most notable application of IPT to-date is Electric Vehicle (EV) charging.

Figure 9:
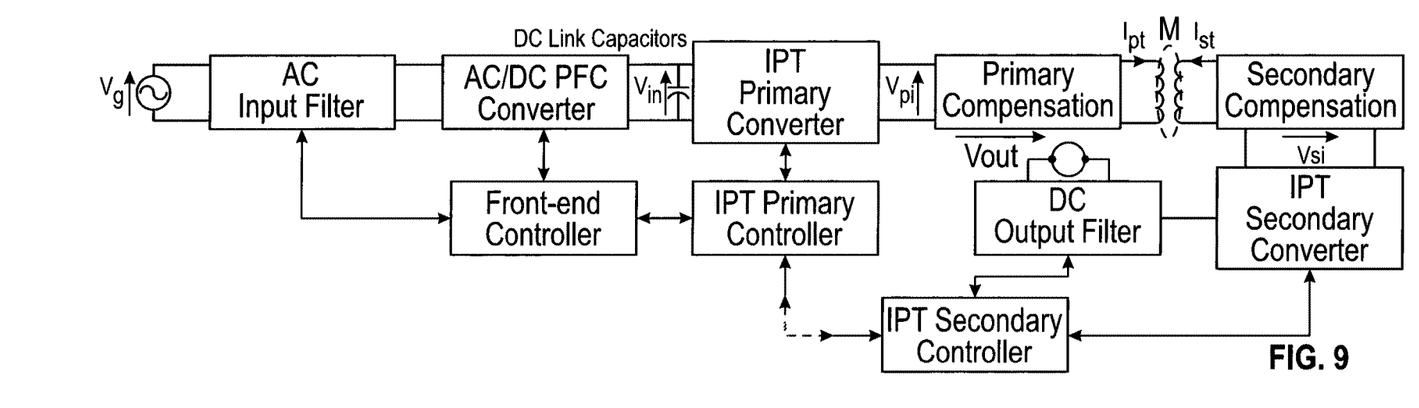
FIG. 9 also depicts a conventional multi-stage approach for the grid-integration of an IPT system.

The majority of these applications, including EV charging, require energy from the utility grid; however, the conversion of energy from to utility grid to a form appropriate to drive the primary magnetic coupler of an IPT system still remains a challenge. Commonly IPT systems utilize three power conversion stages, as shown in FIG. 9. The first stage is a grid-tied converter, which is responsible for controlling the grid current in accordance with IEC61000-3-2, and regulating the voltage across the DC-link capacitor. The stiff DC-link voltage is used as an input to the next stage, the primary IPT converter, which is typically a Voltage Source Inverter (VSI) such as a Dual Active Bridge (DAB). Alternatively, a Current Source Inverter (CSI), such as a push-pull converter, could be used at the expense of a larger DC inductor. The output of the primary inverter, which is either a high frequency voltage or current, feeds the primary compensation network and the primary magnetic coupler, Lpt. Due to the high leakage inductance of both primary and secondary magnetic couplers, compensation networks are required to lower reactive power drawn, hence allowing efficient operation of the primary IPT converter. Since the primary and secondary magnetic couplers are magnetically coupled through the mutual inductance, M, the high frequency current present in Lpt, induces a voltage across the secondary magnetic coupler, Lst. This induced voltage results in current flowing out of the secondary compensation networks and into the secondary converter, which rectifies and filters the high frequency current, thus allowing only the DC component to be delivered to the EV battery.

In a unidirectional IPT system, the secondary converter can simply be a diode rectifier followed by a passive filter. However, an active rectifier can be used to improved efficiency and power regulation capabilities, as well as to enable bi-directional power transfer. Although this is the architecture of the most commonly used IPT systems, it has multiple drawbacks leading to higher cost, lower power density and reduced reliability. These drawbacks include high component count due to multiple conversion stages, large input filter inductor, and the large DClink.

As a solution, previously, the use of a matrix converter to replace both the grid-tied converter and the IPT primary converter was investigated. As opposed to a standard full-bridge, a matrix converter can be controlled to directly generate a high-frequency AC voltage from the low frequency grid voltage, hence eliminating the need for a grid-tied converter. Furthermore, in, the current source nature of the IPT system was exploited to eliminate the input filter inductor. Conversely, the use of bidirectional switches requires very precise switching times, thus requiring a complex digital controller to ensure a freewheeling path is always present for the high-frequency current. Alternatively, a soft DC-link approach has also been investigated in the past. This approach is similar to a conventional multi-stage approach; however, minimal capacitance is utilized at the DC-link. As a result, the voltage at the DC-link is a full-wave rectified version of the grid voltage. This is advantageous as it allows the primary IPT converter to control the grid current by, again, exploiting the current source nature of the IPT system. Furthermore, the use of standard unidirectional switches, assists in lowering the constraint on switching precision. Although the two aforementioned approaches improve on aspects of the conventional approach, the lack of any low frequency energy storage elements i.e. large DC-link capacitance, limit the voltage available to drive the primary magnetic coupler and also allow the twice grid frequency power ripple to propagate through to the EV battery. Both these factors lead to higher current stresses throughout the system, and as such, lead to lowered efficiencies.

Furthermore, the limitations of the above methods can be mainly attributed to limited supply and output voltages found in typical applications. Increasing the operating voltage of these systems can be a simple, yet expensive solution. For example, additional power converters can be used to boost/buck supply/load voltages, however an increased component count and reduced efficiency lead to an undesired solution.

The present disclosure is directed to overcoming one or more of the problems set forth above by providing an improved circuit topology to address some of the drawbacks found in previously developed IPT systems.

In this specification where reference has been made to patent specifications, other external documents, or other sources of information, this is generally for the purpose of providing a context for discussing the features of the disclosure. Unless specifically stated otherwise, reference to such external documents is not to be construed as an admission that such documents, or such sources of information, in any jurisdiction, are prior art, or form part of the common general knowledge in the art.

OBJECTS OF THE DISCLOSURE

It is an object of the disclosure to provide a converter which will at least go some way to overcoming disadvantages of existing systems, or which will at least provide a useful alternative to existing systems.

Further objects of the disclosure will become apparent from the following description.

SUMMARY OF DISCLOSURE

Accordingly, in one aspect the disclosure may broadly be said to consist in an AC-AC converter comprising a bridge circuit including at least two half-bridge converters, each half bridge converter comprising a first switch at an upper end and a second switch at a lower end, a capacitor connected to each half-bridge converter, the half bridge converters being connected to each other between the respective first switches and second switches thereof, the upper ends of each half bridge converters being connectable to a primary energy source, wherein the converter is operable to provide a controllable AC output.

Preferably, the first and the second switches are configured to charge and discharge the capacitors and regulate the current supplied to the AC output.

Preferably, the first and the second switches are configured to provide a natural freewheeling path.

In one embodiment the primary energy source comprises an inductive element.

Preferably, the primary energy source comprises the inductive element and an AC supply.

Preferably, the inductive element is adapted to transfer energy between the primary energy source and the AC output.

Preferably, a current through inductive element is controlled to control a voltage of each capacitor.

Preferably, at least one of the half-bridge converters includes a compensation network connected between one of the primary energy storing units and the respective half-bridge converter.

Preferably, at least one of the half-bridge converters includes a compensation network connected between each of the second switches of the half bridge converters and the output.

Preferably, the primary energy source comprises one or more of an inductive element and/or a pickup coil (grid connection with an inductor).

Preferably, the primary energy source may also comprise, one or more of an inductive element and an AC source in case of direct grid connection, Alternatively, the primary energy source may also comprise, a transformer/pick-up coil together with leakage or separate inductive element for isolated connections.

Preferably, the first and the second switches are configured to alternatively charge and discharge the capacitors and regulate the current supplied to a load.

Preferably, the primary energy source is configured to buck and/or boost a current from the energy source.

Preferably the switches are operable to dispose the converter in a first operational state and a second operational state.

Preferably the duration, or relative duration, of each state is controlled to control the AC output.

Preferably in the first state one capacitor is charged while the other is discharged.

Preferably at least one of the half bridges delivers power to the output during each state.

Accordingly, in another aspect the disclosure may broadly be said to consist in an AC-AC converter comprising a bridge circuit including at least two half-bridge converters, each half bridge converter comprising a first switch at an upper end and a second switch at a lower end, a capacitor connected to each half bridge converter, the half bridge converters being connected to each other between the respective first switches and second switches thereof, the upper ends of each half bridge converter being connectable to a primary energy source, and an output inductive element in series with the second switch of each half-bridge converter, wherein the output inductive elements are transformer coupled to provide a controllable AC output.

Preferably, the primary energy source comprises an input inductive element.

Preferably, the primary energy source comprises the input inductive element and AC source.

A controller is provided to control the switches of the boost active bridge. The controller is also configured to control the duty cycle and/or phase of the switches.

The controller may have one or more input control variables as inputs for controlling the switches. Control of the duty cycle of the switches can control two output variables of the converter. The two output parameters can comprise the voltage of each first energy source and the magnitude of the fundamental voltage across the third energy source.

Alternatively, the controller may control the energy transfer between each source to optimise the operation (efficiency and power transfer) of the converter.

The controller may control the duty cycle of the legs symmetrically.

In another aspect the disclosure may broadly be said to consist in a bridge converter comprising two converters according to the preceding statement wherein the AC energy sources are coupled to each other.

In one embodiment the coupled AC energy sources provide isolation.

In one embodiment the AC sources are loosely coupled. The loose coupling allows inductive power transfer between the converters.

In another aspect the disclosure broadly provides an IPT system (50) comprising at least one converter according to the preceding statement.

In another aspect, the disclosure broadly provides a method of providing a controllable AC output of an AC-AC converter, the method comprising the steps of:

switching pairs of a respective first and second switches such that a current is alternately directed through an upper end of one of a half bridge converter to a lower end of another half bridge converter or vice versa; controlling the duty cycle of the or selected bridge switches to control at least one of:

a) the current and/or voltage across the primary energy source;
b) the DC-bias across each of the first and second half-bridge converters.

Additionally, if the secondary converter is capable of bidirectional power flow, the grid current can also be controlled to deliver power to the grid.

This functionality enables Vehicle to Grid (V2G) services such as, voltage/frequency regulation, and reactive power/harmonics compensation.

The concept can be extended with multiple switches, for example to supply a three-phase system.

As used herein the term "and/or" means "and" or "or", or both.

As used herein "(s)" following a noun means the plural and/or singular forms of the noun. The term "comprising" as used in this specification means "consisting at least in part of". When interpreting statements in this specification which include that term, the features, prefaced by that term in each statement, all need to be present, but other features can also be present. Related terms such as "comprise" and "comprised" are to be interpreted in the same manner.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7).

The entire disclosures of all applications, patents and publications, cited above and below, if any, are hereby incorporated by reference.

The disclosed subject matter also provides a method or system which may broadly be said to consist in the parts, elements and features referred to or indicated in this specification, individually or collectively, in any or all combinations of two or more of those parts, elements or features. Where specific integers are mentioned in this specification which have known equivalents in the art to which the disclosure relates, such known equivalents are deemed to be incorporated in the specification.

Other aspects of the disclosure may become apparent from the following description which is given by way of example only and with reference to the accompanying drawings.

DRAWING DESCRIPTION

A number of embodiments of the disclosure will now be described by way of example with reference to the drawings as follows.

DETAILED DESCRIPTION OF THE DRAWINGS

Figure 1:
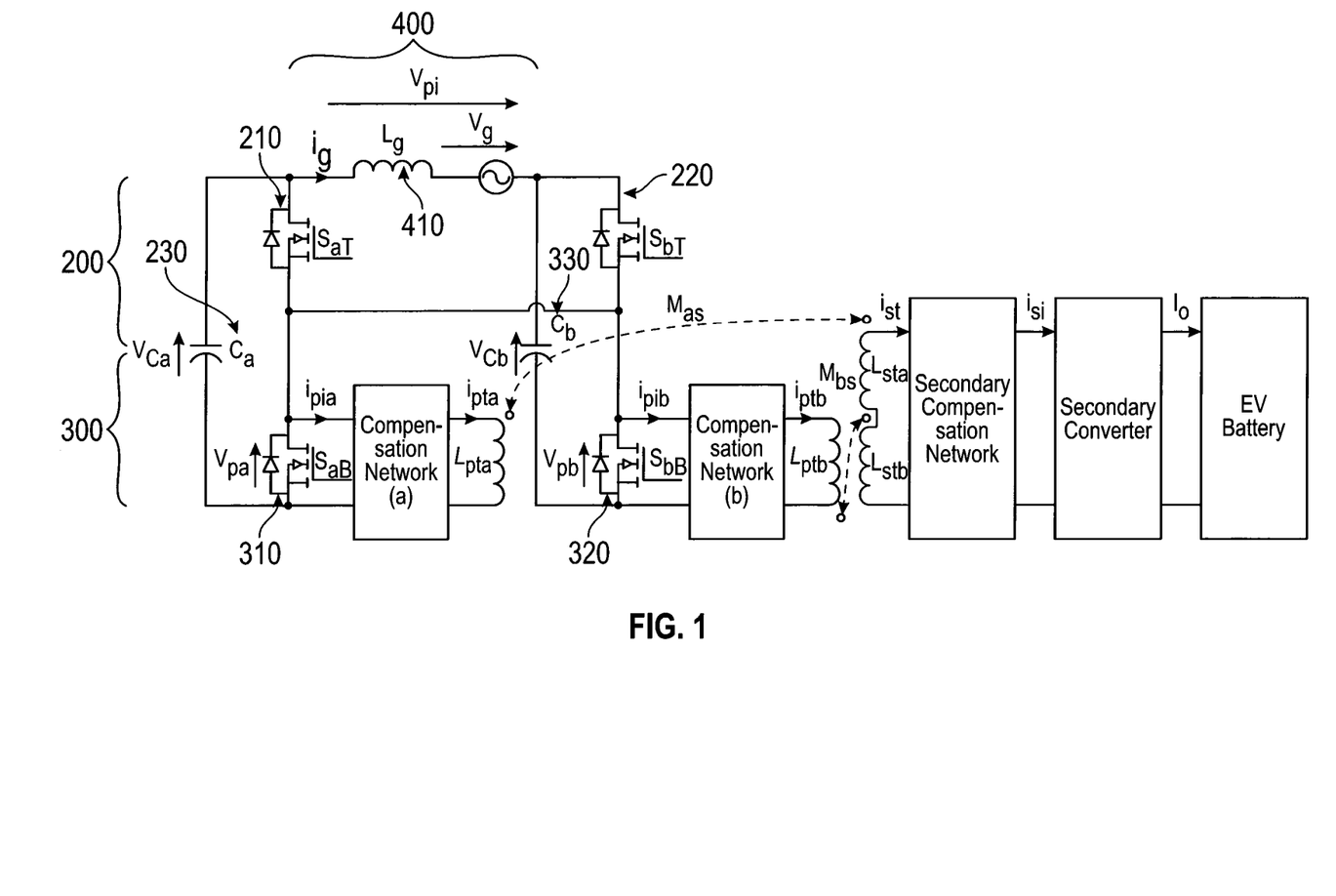
FIGS. 1 and 10 are circuit diagrams showing the topology of a converter of the present disclosure, referred to in this document as Boost AC Bridge (BACB) converter.
Figure 8:
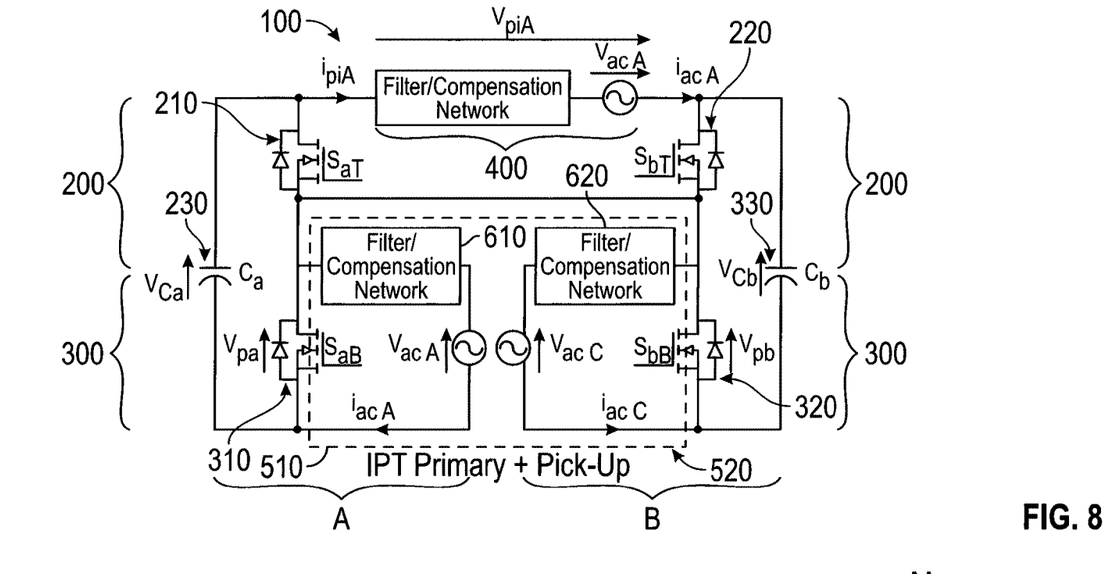
FIG. 8 also depicts a circuit diagram showing the topology of a converter of the present disclosure, referred to in this document as Boost AC Bridge (BACB) converter.

The current disclosure discloses a novel Boost AC Bridge (BACB) converter 100 shown in FIG. 1 (a similar embodiment is also shown in FIG. 8). As can be taken from the figure, the current BACB converter 100 utilizes a single AC-AC power conversion stage consisting of a bridge circuit which includes two half-bridge converters, where each half-bridge drives a primary magnetic coupler 510, 520 attached to it through a compensation network 610, 620. Each half bridge converter comprises a first switch 210, 220 at an upper end 200 of each half bridge converter and a second switch 310, 320 at a lower end 300 thereof, as well as a capacitor 230, 330 connected to each half bridge, i.e., connected between the upper end 200 and the lower end 300. The components shown on the left side of the schematic of FIG. 1 vis-à-vis inductors Lpta and Lptb correspond to exemplary means for wirelessly transferring power and the components shown on the left side of the schematic of FIG. 1 vis-à-vis inductors Lsta and Lstb correspond to exemplary means for wirelessly receiving power. When power is transferred from inductors Lpta and/or Lptb to inductors Lsta and/or Lstb, the means for wirelessly transferring power is in wireless communication with the means for wirelessly transferring power.

A primary energy source 400 is connected between the upper ends 200 of each half-bridge converter. Primary energy source 400 may simply comprise a coil (i.e., an inductor) in which an AC voltage may be induced for example a pick-up coil of an IPT system. The source 400 may alternatively comprise in an AC supply in series with an inductor 410. In the shown embodiment, the two half bridges are connected to the live and the neutral of a single-phase utility grid through an inductive element 410 which acts as an input filter. The disclosure enables generation of a controlled grid current, while also boosting the voltage driving the primary magnetic couplers. The disclosure also minimises the output power ripple using relatively low DC-link capacitance. An advantage of the converter 100 of the present disclosure (BAB) is its ability to operate at twice the input voltage and thus reducing conduction losses in the system. Also, the converter 100 of the present disclosure eliminates the issue of DC offset currents that may cause undesirable issue such as core saturation. Thus, for example the need for AC coupling capacitor used in traditional system can be eliminated further improving the efficiency and reliability while lowering the cost.

In comparison to the conventional approach, the grid-tied converter and the primary IPT converter are replaced with two half-bridge legs. Switches 210 ($S_{aT}$) and 310 ($S_aB$) form halfbridge leg A whereas switch 220 ($S_{bT}$) and switch 320 ($S_{bB}$) form half-bridge leg B. The DC-side of each half-bridge leg A, B is connected to an individual energy storage capacitor 230 ($C_a$) and 330 ($C_b$), respectively. The AC-side of each half-bridge leg A, B is connected to a primary magnetic coupler 510, 520 through a compensation network 610, 620. Although the proposed converter 100 can operate with either series, parallel or hybrid compensation networks, the type of compensation network should be chosen based on the desired power transfer characteristics. Similarly, the choice of magnetic coupler also plays an important role in determining system power transfer characteristics, and thus should be chosen carefully.

The DC-side of each half-bridge leg A, B is connected to the live and the neutral of the primary energy source 400, in this case the single-phase utility grid, through an inductive element 410 which acts as an input filter. For simplicity, a single inductor is used as a grid-filter in this example; however, for further attenuation of grid current harmonics and a reduction in size of passive elements, a higher order filter can also be used.

In a practical circuit, the closed-loop controller will regulate the power-flow to ensure that the voltages across both $C_a$ and $C_b$ are maintained within a predetermined range. Therefore, it is assumed that initially both $C_a$ and $C_b$ are charged to about 750 V, which is significantly higher than the peak grid voltage. Under nominal operation, each half-bridge is switched in a complimentary manner at, or close to, the resonant frequency of the compensation networks. Therefore, switching half-bridge leg B 180 degrees out of phase with respect to half-bridge leg A, results in two distinct operational states, during the positive-half and the negative-half of the grid voltage. Circuit operation during a positive-half period, is illustrated below, where FIG. 2(a) represents state-I and FIG. 2(b) represents state-II. State-I occurs when switches $S_{aT}$ and $S_{bB}$ g are ON, while state-II occurs when switches $S_{bT}$ and $S_{aB}$ are ON. The duration of state-I can be defined as $D \cdot T_s$, where D represents the converter duty-cycle and $T_s$ represents the duration of one switching period. Similarly, the duration of state-II is given by $(1-D)T_s$.

Figure 2:
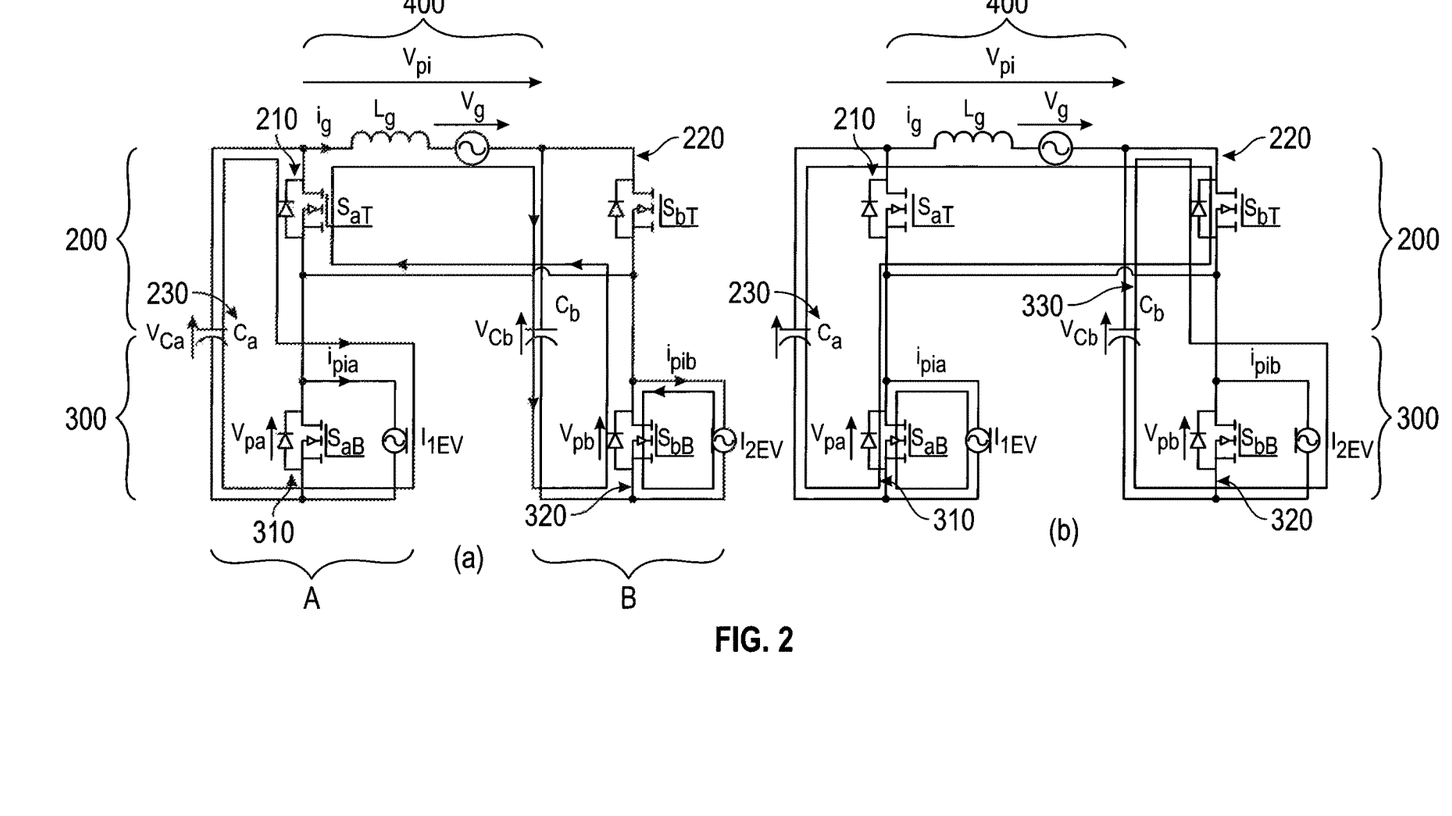
FIGS. 2A to 2B is a general circuit diagram showing the current flow during (a) State I (b) State II of the BACB converter.

As shown in FIG. 2 (a), during state-I, $C_a$ is discharged and energy stored is transferred to the EV through the secondary side converter. For simplicity, the EV and the IPT system are modelled using ideal AC current sources, $I_{1EV}$ and $I_{2EV}$. Simultaneously, $C_b$ is charged by transferring energy from the grid and $L_g$, resulting in an increase in $v_{ca}$, while $i_g$ reduces. During state-II, both $C_a$ and the grid deliver energy to $L_g$, resulting in an increase in $i_g$ and a reduction in $v_{ca}$. Simultaneously, energy is delivered to the EV via $C_b$. Since the circuit is symmetric, when the polarity of the grid voltage is reversed, the roles of $C_a$ and $C_b$ are reversed but the operating principles are similar. As such, $i_g$, and therefore power transferred to the EV, can be controlled by modulating between states (i.e. controlling D). Furthermore, controlling $i_g$ allows indirect control over the DC-bias voltage across both $C_a$ and $C_b$. Controlling the DC-bias voltage to be much greater than the peak grid voltage and actively cycling the capacitor voltage enables the proposed BACB to reduce conduction losses and utilize smaller capacitors. The anti-parallel diodes of the switches guarantee positive voltages across both $C_a$ and $C_b$, and the closed-loop controller ensures that the minimum voltage $C_a$ and $C_b$ reach is significantly higher than the peak grid voltage. Another advantage of this configuration is that during each state at least one of the half-bridge legs delivers energy to the EV, and as a result the single-phase power ripple is significantly reduced, even when utilizing relatively low capacitances. Additionally, if the secondary converter is capable of bidirectional power flow, the grid current can also be controlled to deliver power to the grid. This functionality enables Vehicle to Grid (V2G) services such as, voltage/frequency regulation, and reactive power/harmonics compensation.

The operating principles of the alternative circuit configuration of BACB technology is similar to the operating principles presented above. FIGS. 7A to 7D depict illustrations of alternative embodiments of the current disclosure. A skilled person would understand that the operational characteristics of each of these embodiments are similar to the description above.

Proposed Control Scheme

Figure 3:
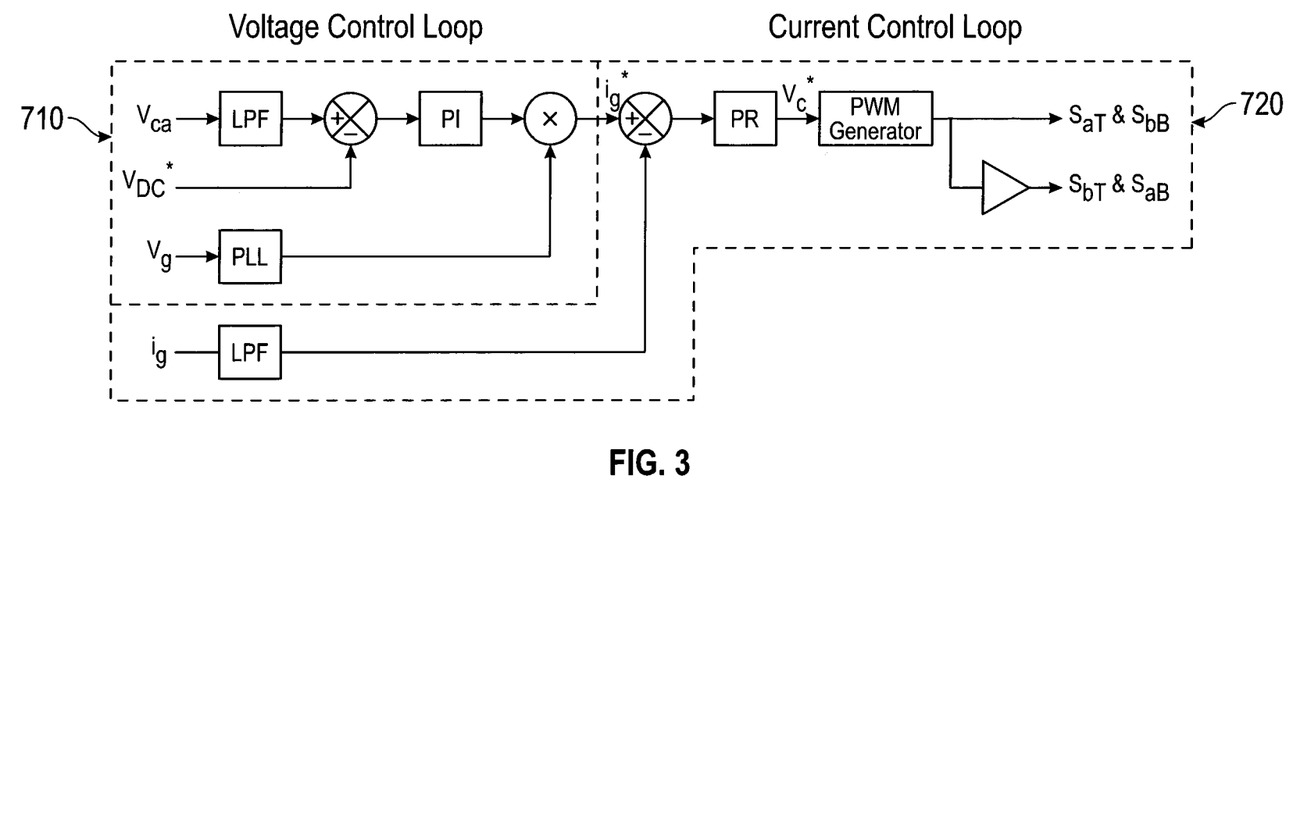
FIG. 3 depicts a PR controller based grid-inverter control scheme of a dual grid inverter.

As previously stated, both the grid current and the DC-bias voltage across $C_a$ and $C_b$ require regulation. Since regulating the DC-bias voltage requires much lower controller bandwidth when compared to grid current regulation, a commonly used PR controller based grid-inverter control scheme can be employed as illustrated in FIG. 3. The controller is divided into a slower outer voltage control loop (710) and a faster inner current control loop (720). The bandwidth of the inner loop is designed to be at least 10 times greater than the outer loop, thus decoupling the dynamics of the two controllers to reduce design complexity. Since the circuit is symmetric and the average duty-cycle of both half-bridges are equal, the average voltage across $C_a$ and $C_b$ are approximately the same. Therefore, the outer loop takes in the average voltage across $C_a$ and compares it to a reference DC voltage. The resulting error signal is then fed into a PI controller, whose output is multiplied with a reference sinusoidal signal derived by a phase-locked loop (PLL). This sinusoidal signal in turn generates the current reference required for the faster inner loop. As minimal steady-state error is required for the grid current, the inner loop is based on a Proportional-Resonant (PR) controller, whose output generates a control signal, $v_c$. $v_c$ is delivered to a PWM generator, which compares it to a 0-1 V symmetric-triangular carrier to derive the switching signals. Since this control scheme is commonly used in standard grid inverter applications, a wide-variety of integrated circuits (IC's) providing such functionality are readily available. For certain applications, the use of IC's, as opposed to digital controllers is preferred, as this greatly reduces overall cost.

IPT Integration

The sinusoidal signal control signal generated by the PR controller, $v_c$, leads to a power ripple and impacts the average power transferred to the EV. Therefore, to derive the relation between system parameters, control variables and the output power, a peak-modulation index, $M_i$, is defined as the peak $v_c$ over one grid period. Using M the average power transferred to/from the EV can be approximated as follows, $$P_o = P_{No}\left[\frac{1 + \sin(\pi M_i)}{2}\right] \quad (1)$$

Where $P_{No}$ is, $$P_{No} = \frac{8V_{dc}V_s}{\omega_T M \pi^2}\sin\left(\frac{\varphi_s}{2}\right) \quad (2)$$

Where Vdc is the average voltage across $C_a$ and $C_b$; $V_s$ is the EV battery voltage; $\omega_t$ is the switching frequency; M is the mutual inductance between the primary and secondary magnetic couplers; and φs is the secondary side phase modulation. Accordingly, a lower peak modulation index leads to higher power transfer as well as a lower output power ripple. However, the peak modulation index is also proportional the ratio between the peak grid voltage and the average $V_{Ca}$ and $V_{Cb}$. Therefore, minimizing $M_i$, requires increasing the voltage rating of the capacitors and the switches.

Simulation Results

In order to verify the operation of the proposed BACB based IPT system and control scheme, a 3 kW system was designed and simulated using MATLAB/PLECS. Both the primary and secondary compensation networks were chosen to be LCL tuned networks, while the secondary converter employed an active-rectifier. The parameters of the simulated system are tabulated below, in Table I.

Figure 4A:
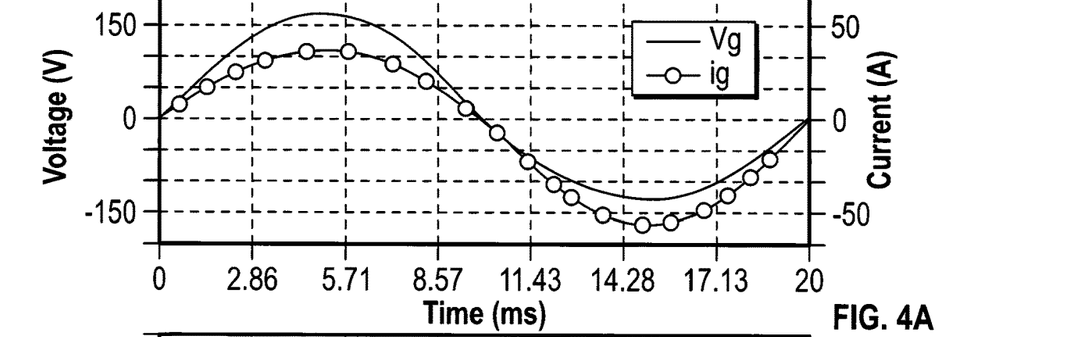
FIGS. 4A to 4D shows simulation waveforms produced by BACB converter, including (a) grid voltage and current (b) voltage across $C_a$ and $C_b$ (c) power delivered by each individual bridgeleg and the overall power transfer (d) converter duty-cycle.
Figure 4B:
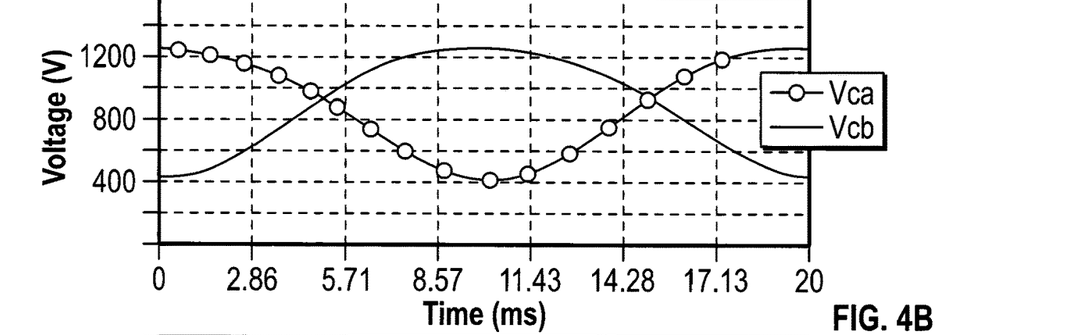
Figure 4C:
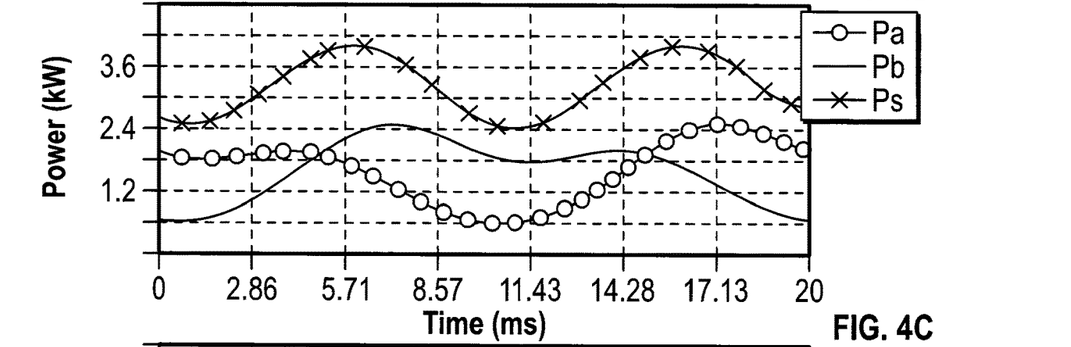
Figure 4D:
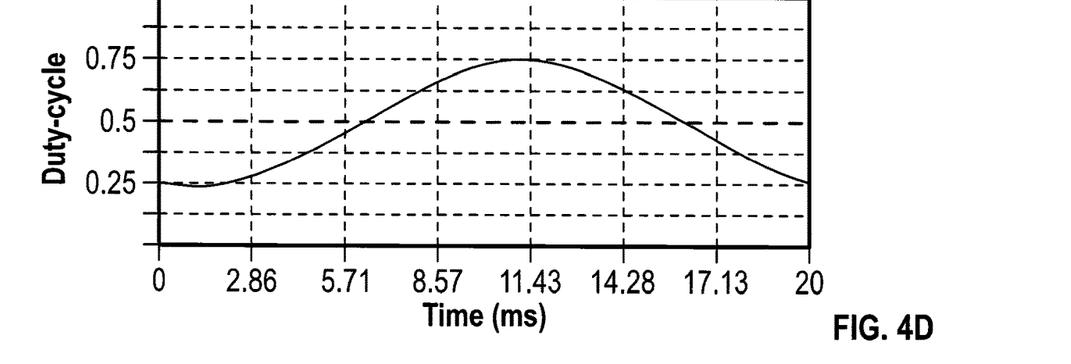

Simulation results, over one period of the grid-voltage, are presented below in FIG. 4. FIG. 4 (a) displays the grid current and voltage. As evident, the proposed control scheme is capable of controlling the grid current with very low harmonic distortion and unity power factor.

Furthermore, the control scheme can simultaneously control the average voltage across $C_a$ and $C_b$, as shown by FIG. 4 (b). The average DC-bias across both the capacitors is approximately 900 V, and the low frequency voltage ripple is approximately 800 $V_{pp}$. In comparison to a conventional system, the low frequency voltage ripple is relatively large; however, since the ripple on each capacitor is 180 degrees out of phase, the overall output power ripple is reduced. This characteristic is evident in FIG. 4 (c), where the power delivered by each half-bridge leg, $P_a$ and $P_b$, as well as the overall power delivered to the secondary side, $P_s$, is shown. As shown, when the voltage across $C_a$ reduces, so does the power delivered by leg-A; however, at the same time, the voltage across $C_b$ increases, increasing the power transferred by leg-b. Overall, these two affects negate each other, resulting in a lower output power ripple. Lastly, FIG. 4 (d) illustrates the control signal, d, generated by the PR controller, which varies from 0.25 to 0.75, thus enabling the BACB to utilise 85% of the available voltage range.

TABLE I

SIMULATION PARAMETERS

| Parameter | Value |
|---|---|
| $V_g$ | 120 VAC |
| Vdc | 800 V |
| $V_s$ | 400 V |
| $C_a$, $C_b$ | 150 μF |
| $L_g$ | 500 uH |
| Cpia, Cpib | 100 nF |
| Lpia, Lpib | 55 μH |
| Lpta, Lptb | 20 μH |
| Cpa, Cpb | 175.3 nF |
| $C_s$ | 87.65 nF |
| Lsta, Lstb | 20 μH |
| $L_{si}$ | 40 μH |
| Mas, Mbs | 5.4 μH |
| $f_T$ | 85 kHz |

Alternative Approaches

Figure 5:
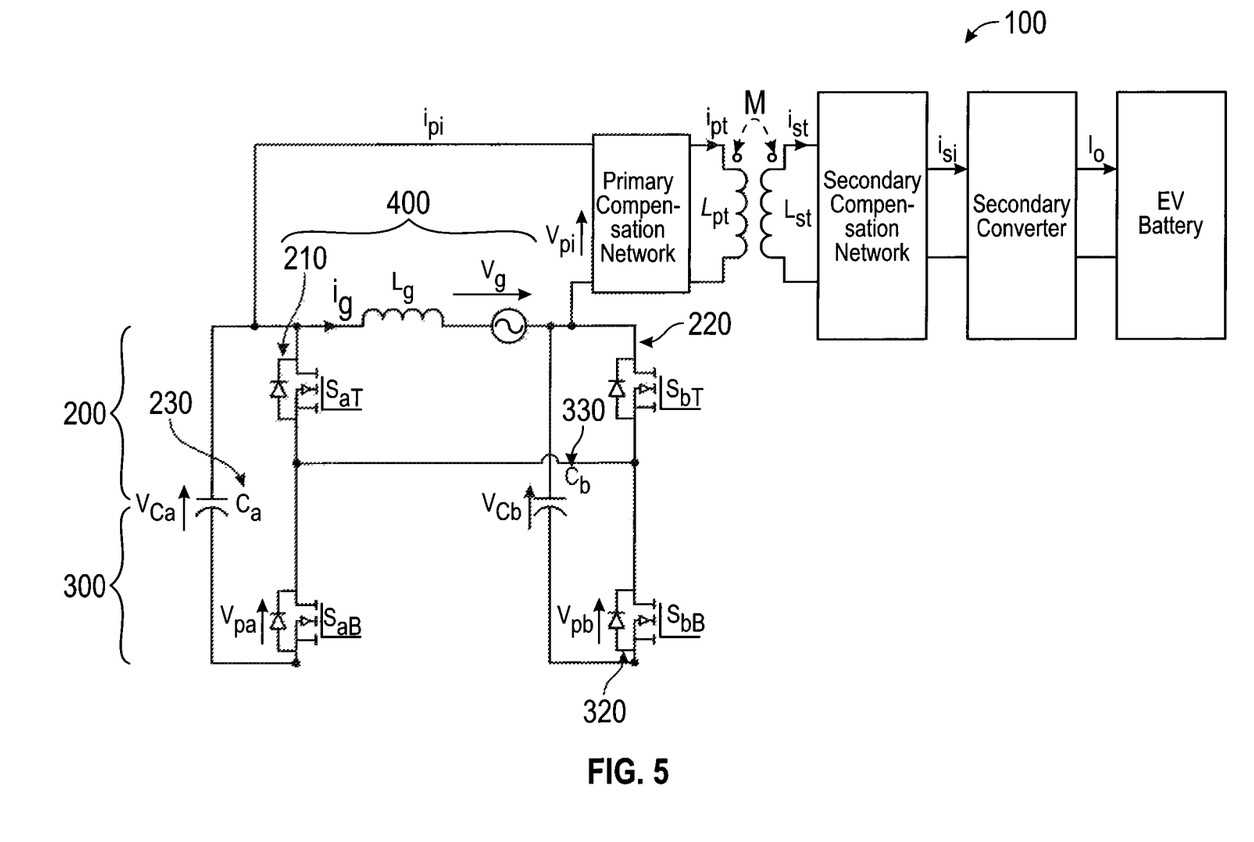
FIG. 5 illustrates an alternative embodiment allowing the use of a single primary magnetic coupler of the present disclosure.

Alternative applications for the proposed technology are presented below. The first of which, illustrated in FIG. 5, is somewhat similar to FIG. 1. However, in this case, the primary compensation network is connected in parallel with the grid filter and voltage. This allows the use of a single primary and secondary magnetic coupler, as opposed to two. On the other hand, the voltage and current stress on the primary magnetic coupler and compensation network is doubled, resulting in reduced efficiency.

Figure 6:
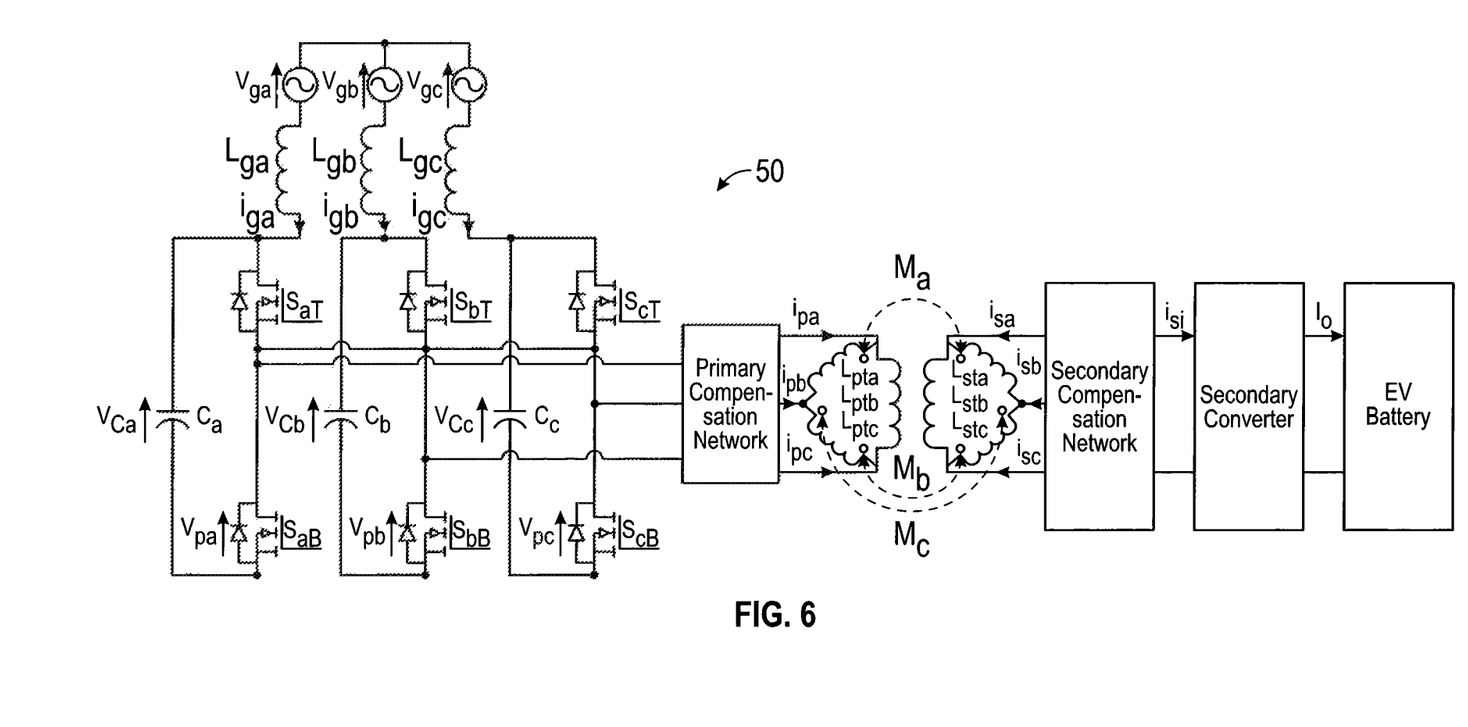
FIG. 6 illustrates an alternative embodiment suitable for three-phase high-power applications.
Figure 7A:
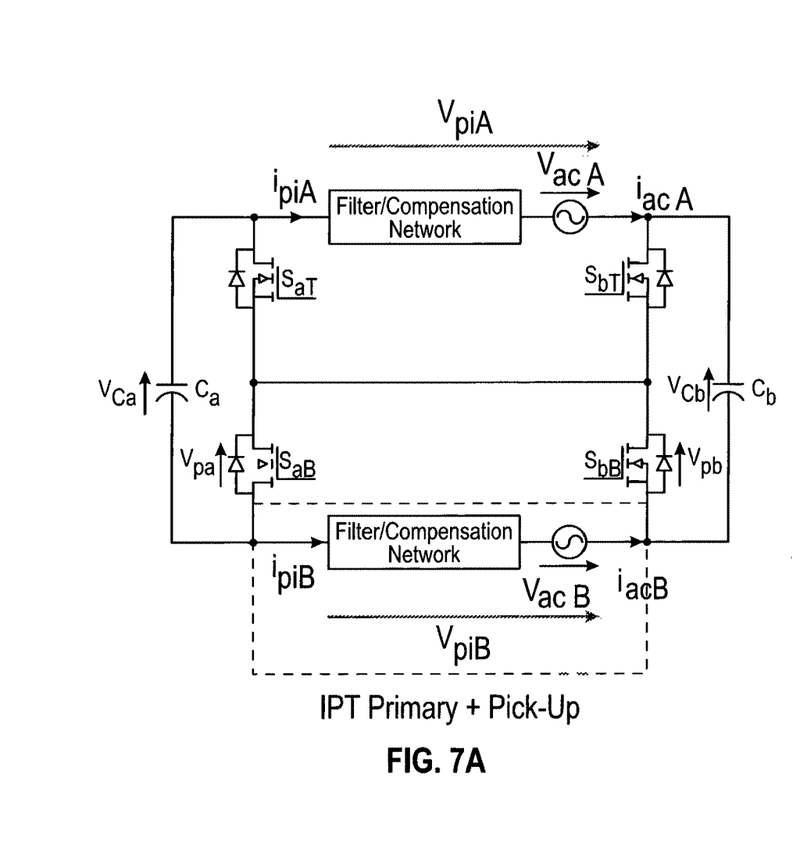
FIGS. 7A to 7D depict multiple embodiments of the BACB converter.
Figure 7B:
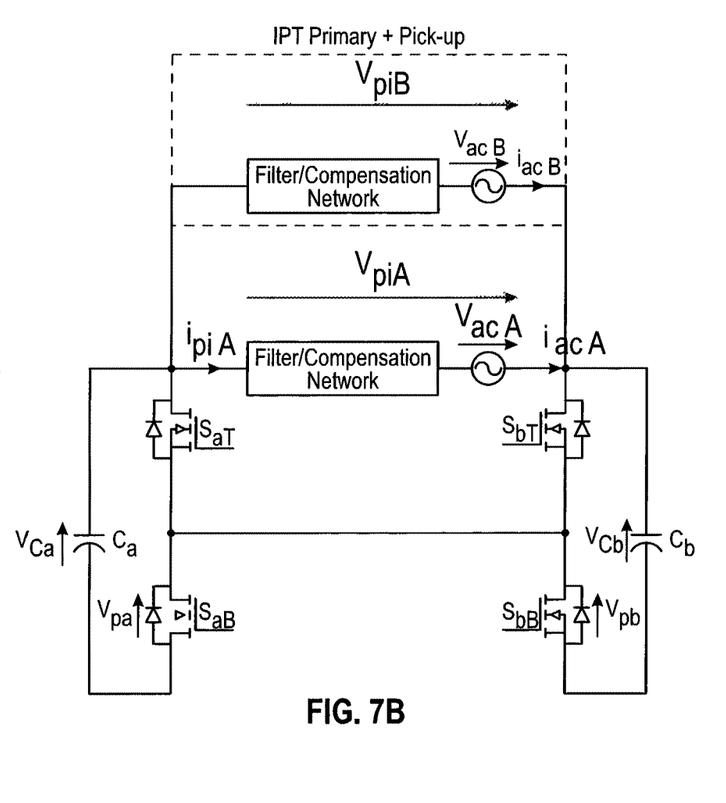
Figure 7C:
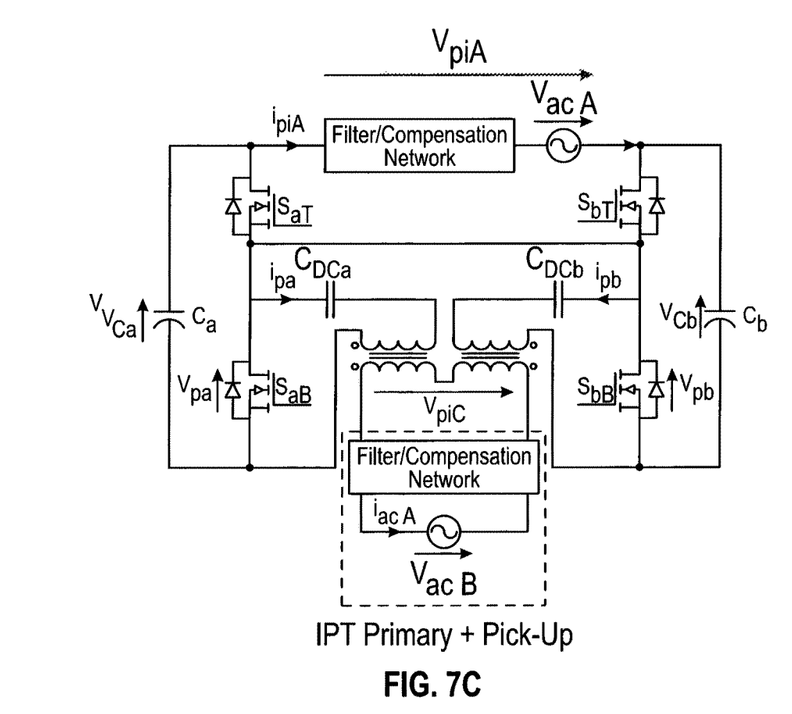
Figure 7D:
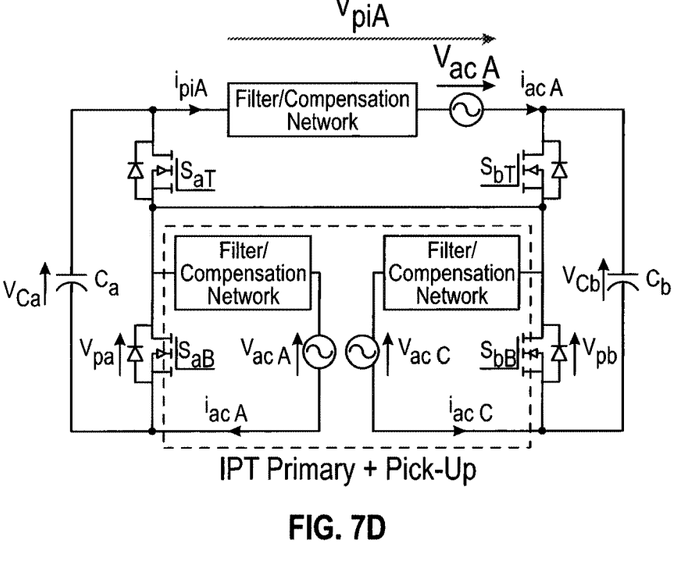

The currently proposed BACB technique can be extended to a three-phase grid-integrated IPT based EV charger, as depicted in FIG. 6. This application is useful as the demand for faster EV battery charging rates continues to grow beyond the capabilities of a single-phase supply. A modified space-vector modulation scheme can be employed to control this converter. A threephase IPT network, together with three-phase magnetic couplers can be used to provide improved efficiency and spatial tolerance.

A novel single-stage grid integration technique for IPT based EV chargers, which improves on drawbacks found in existing approaches is disclosed. Specifically, this aims to reduce the component count, and thus the overall cost of the converter. As discussed previously, this goal is achieved by combining the functionalities of the grid-tied inverter and the IPT primary converter into a single power conversion stage. Additionally, this approach also lowers the required capacitance for a given output power ripple, thus further reducing cost, and improving energy density and reliability. Through simulation results it was shown that, not only did the proposed converter have the ability to regulate the grid current with low THD and unity power factor, it also provided a voltage boosting feature, which is lacking in existing direct AC-AC converters.

In particular, though not solely, the present disclosure aims at providing an improved circuit topology that enables the use of DC switches to generate an AC output from an AC input source. Additionally, this approach also lowers the required capacitance for a given output power ripple, thus further reducing cost, and improving energy density and reliability. It also provides a voltage boosting feature, which is lacking in existing direct AC-AC converters.

Throughout the description like reference numerals will be used to refer to like features in different embodiments.

Unless the context clearly requires otherwise, throughout the description, the words "comprise", "comprising", and the like, are to be construed in an inclusive sense as opposed to an exclusive or exhaustive sense, that is to say, in the sense of "including, but not limited to".

Although this disclosure has been described by way of example and with reference to possible embodiments thereof, it is to be understood that modifications or improvements may be made thereto without departing from the scope of the disclosure. The disclosure may also be said broadly to consist in the parts, elements and features referred to or indicated in the specification of the application, individually or collectively, in any or all combinations of two or more of said parts, elements or features. Furthermore, where reference has been made to specific components or integers of the disclosure having known equivalents, then such equivalents are herein incorporated as if individually set forth.

Any discussion of the prior art throughout the specification should in no way be considered as an admission that such prior art is widely known or forms part of common general knowledge in the field.

Figure 10:
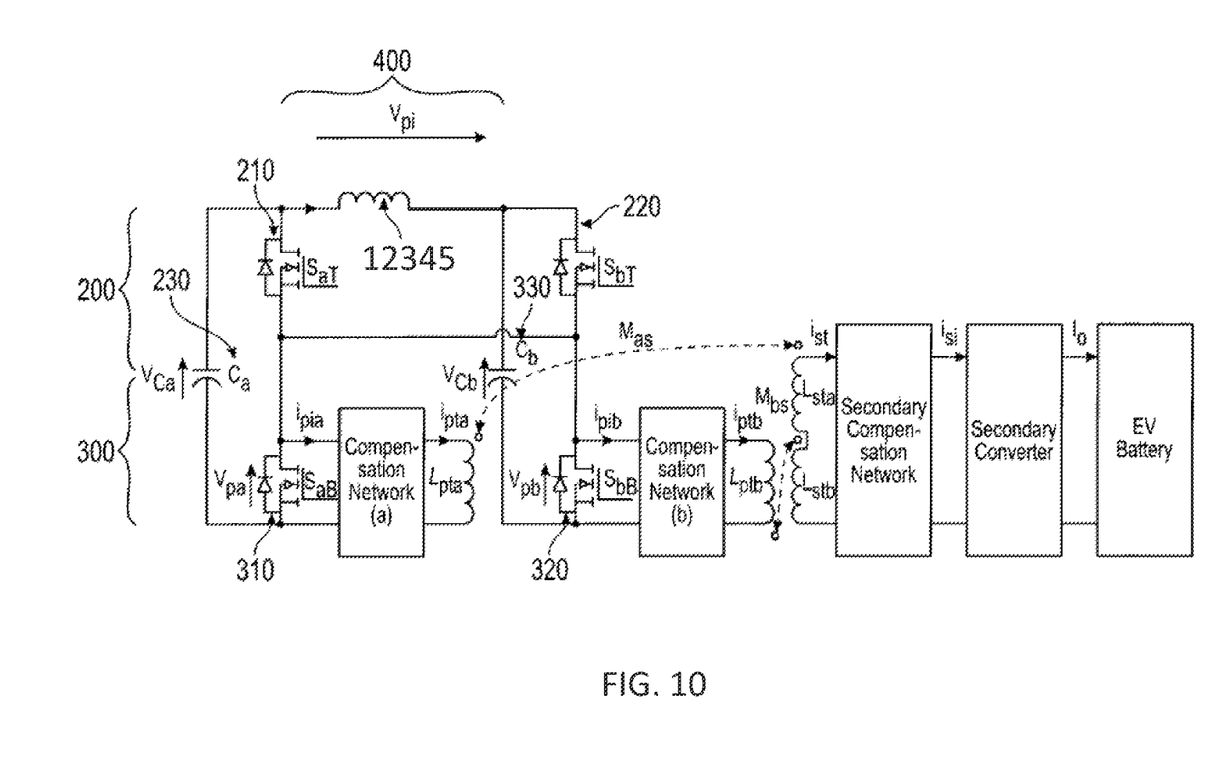

FIG. 10 shows the arrangement of FIG. 1, except that the primary energy source comprises a transformer/pick-up coil 12345.

The invention claimed is:

1. An AC-AC converter comprising a bridge circuit including at least two half-bridge converters respectively including a first switch at an upper end and a second switch at a lower end, a respective capacitor connected to respective half-bridge converters, the half bridge converters being connected to each other between the respective first switches and second switches thereof, the respective upper ends of the half bridge converters being connectable to a primary energy source, wherein the AC-AC converter is operable to provide a controllable AC output, wherein the AC-AC converter is connected to the primary energy source, which primary energy source is grid power with an inductor that is in series with the respective second switches of the respective half-bridge converters.

2. The AC-AC converter as claimed in claim 1 wherein the first and the second switches are configured to charge and discharge the capacitors and regulate the current supplied to the AC output.

3. The AC-AC converter as claimed in claim 1, wherein the first and the second switches are configured to provide a natural freewheeling path.

4. A system, comprising:
the AC-AC converter as claimed in claim 1; and
the primary energy source, wherein a current through the inductor is controlled to control a voltage of respective capacitors.

5. The AC-AC converter as claimed in claim 1, wherein at least one of the half-bridge converters includes a respective compensation network connected between respective second switches of the half bridge converters and the output.

6. A system, comprising:
the AC-AC converter as claimed in claim 1; and
the primary energy source, wherein the primary energy source also comprises a transformer/pick-up coil together with a leakage or separate inductive element for isolated connections.

7. The AC-AC converter as claimed in claim 1, wherein the first and the second switches are configured to alternatively charge and discharge the capacitors and regulate the current supplied to a load.

8. A system, comprising:
the AC-AC converter as claimed in claim 1; and
the primary energy source, wherein the primary energy source is configured to buck and/or boost a current from the energy source.

9. The AC-AC converter as claimed in claim 1, wherein the switches are operable to dispose the converter in a first operational state and a second operational state.

10. The AC-AC converter as claimed in claim 9, wherein the duration, or relative duration, of the states is controlled to control the AC output.

11. The AC-AC converter as claimed in claim 9, wherein, in the first state, one capacitor is charged while the other is discharged.

12. The AC-AC converter as claimed in claim 11, wherein at least one of the half bridges delivers power to the output during the states.

13. A system, comprising:
the AC-AC converter as claimed in claim 1; and
the primary energy source.

14. The AC-AC converter as claimed in claim 1, wherein at least one of the half-bridge converters includes a compensation network connected between the primary energy source and a half-bridge converter of the at least two half-bridge converts.

15. The AC-AC converter as claimed in claim 1 wherein:
respective roles of the respective capacitors are reversed with reversing voltage of the primary energy source.

16. The AC-AC converter of claim 1, further comprising:
a compensation network, wherein
the compensation network is connected on either side of the primly energy source.

17. The AC-AC converter of claim 1, wherein:
the AC-AC converter includes only one magnetic coupler configured to couple with a secondary magnetic coupler.

18. The AC-AC converter of claim 1, wherein:
the AC-AC converter is controlled so that the at least two half-bridge converters are fed alternating current from the primary energy source; and
the AC-AC converter is controlled so operation of the switches increases the frequency of the alternating current fed to the at least two half-bridge converters.

19. The AC-AC converter as claimed in claim 1, wherein the first and the second switches are positioned and operated to provide a natural freewheeling path.

20. A system, comprising:
the AC-AC converter of claim 1; and
a second converter, the second converter including a magnetic coupler configured to wirelessly receive power from the AC-AC converter.

21. An AC-AC converter comprising a bridge circuit including at least two half-bridge converters respectively including a first switch at an upper end and a second switch at a lower end, a respective capacitor connected to respective half-bridge converters, the half bridge converters being connected to each other between the respective first switches and second switches thereof, the respective upper ends of the half bridge converters being connected to a primary energy source, which primary energy source is grid power, and respective output inductive elements in series with the second switch of respective half-bridge converters, wherein the output inductive elements are transformer coupled to provide a controllable AC output.

22. The AC-AC converter as claimed in claim 21 wherein the AC-AC converter is operable to provide a controllable AC output.

23. A system, comprising:
the AC-AC converter as claimed in claim 21; and
the primary energy source, wherein the primary energy source is configured to buck and/or boost a current from the primary energy source.

24. A method of providing a controllable AC output of an AC-AC converter connected to a primary energy source, the method comprising:
switching pairs of a respective first and second switches such that a current is alternately directed through an upper end of one of a half bridge converter to a lower end of another half bridge converter or vice versa;
controlling the duty cycle of the or selected bridge switches to control at least one of:
a. the current and/or voltage across the primary energy source; or
b. the DC-bias across each of the first and second half-bridge converters, wherein
the switches receive electrical current sourced by grid power, and
an inductor is in series with respective second switches of the respective half-bridge converters, the primary energy source being the grid power with the inductor.

25. The method of claim 24, wherein:
a grid-tied converter and a primary IPT converter are replaced with two half-bridge legs, the two-half bridge legs, a first of the two half-bridge legs corresponding to a first of the first and second switches of the switching pairs of respective first and second switches, and a second of the two half-bridge legs corresponding to a second of the first and second switches of the switching pairs of respective first and second switches.

26. An AC-AC converter comprising a bridge circuit including at least two half-bridge converters respectively including a first switch at an upper end and a second switch at a lower end, a respective capacitor connected to respective half-bridge converters, the half bridge converters being connected to each other between the respective first switches and second switches thereof, the respective upper ends of the half bridge converters being connectable to a primary energy source, wherein the AC-AC converter is operable to provide a controllable AC output, wherein the AC-AC converter is connected to the primary energy source, wherein the primary energy source is a combination of a grid AC source in series with an inductor, and wherein the AC-AC converter includes respective output inductive elements in series with the second switch of the respective half-bridge converters.

27. The AC-AC converter as claimed in claim 26 wherein:
the primary energy source is 120V AC power; and
the capacitors are respectively charged to over six times the voltage of the primary energy source.

28. The AC-AC converter as claimed in claim 26, wherein the AC-AC converter is part of a system that is configured to buck and/or boost a current from the primary energy source.

29. The AC-AC converter as claimed in claim 26 wherein:
the primary energy source, to which the AC-AC converter is connected, is 120V AC power; and
the capacitors are respectively charged to voltages greater than the voltage of the primary energy source.

30. A system, comprising:
the AC-AC converter of claim 26; and
a second converter, the second converter a magnetic coupler configured to wirelessly receive power from the respective output inductive elements.

* * * * *